United States Patent [19]

Herman et al.

[11] 4,131,654

[45] Dec. 26, 1978

[54] THERMOPLASTIC POLYMER BLENDS COMPRISING EPDM, E/EA COPOLYMER AND OPTIONALLY P.E.

[75] Inventors: Richard M. Herman, Elyria; Martin Batiuk, Grafton, both of Ohio

[73] Assignee: The B. F. Goodrich Company, Akron, Ohio

[21] Appl. No.: 855,137

[22] Filed: Nov. 28, 1977

[51] Int. Cl.$^2$ .............................................. C08L 23/16
[52] U.S. Cl. ......................... 260/897 B; 260/23.5 A; 260/42.47; 260/848; 260/897 A
[58] Field of Search ......................................... 260/897

[56] References Cited

U.S. PATENT DOCUMENTS

| | | | |
|---|---|---|---|
| 3,821,333 | 6/1974 | Goodwin et al. | 260/897 B |
| 3,941,859 | 3/1976 | Batiuk et al. | 260/897 B |

*Primary Examiner*—Carman J. Seccuro
*Attorney, Agent, or Firm*—Charles A. Crehore

[57] ABSTRACT

Certain thermoplastic polymer blends have tensile strengths greater than that of any one polymer component. The blends comprise (1) at least one ethylene-propylene-diene (EPDM) polymer, (2) at least one ethylene-ethyl acrylate (EEA) polymer, and (3) optionally, at least one polyethylene. The blends are prepared by mixing physically the polymer components under heat and shear conditions. No curing or crosslinking agents are needed to obtain the superior tensile strengths of the thermoplastic blends. The blends are useful to prepare tubing, sheet products, wire and cable insulation, molded items and the like.

12 Claims, No Drawings

THERMOPLASTIC POLYMER BLENDS COMPRISING EPDM, E/EA COPOLYMER AND OPTIONALLY P.E.

BACKGROUND OF THE INVENTION

Polymer blends of ethylene-propylene (EP) polymers or of ethylene-propylene-diene (EPDM) polymers with α-monoolefin polymers, particularly with polyethylenes, are known in the art (see U.S. Patent Nos. 3,176,052; 3,328,486; 3,361,850 and 3,751,521). At times, curing or crosslinking agents are added to effect chemical changes in the nature of the blends (see U.S. Patent Nos. 3,564,080 and 3,806,558). Polymer blends described in U.S. Patent Nos. 3,785,643 and 3,806,558 are stated to be thermoplastic in nature. They are prepared by partially crosslinking the polymers, particularly the EPDM polymers.

U.S. Patents 3,784,668 and 3,808,047 teach blends of polyethylene with copolymers of ethylene and a polar monomer or ester comonomer. U.S. Patent 3,821,333 discloses a T gasket for lens molds, made from a mixture of ethylene co- or terpolymers (and possibly polyethylene), such as ethylene-vinyl acetate, ethylene-ethyl acrylate, ethylene-propylene, and ethylene-propylene-diene copolymers. Finally, U.S. Patent 3,919,358 teaches blends having superior tensile strength comprising an EPDM polymer having a high degree of unstretched crystallinity, together with a polyethylene.

The polymer blends of the present invention are thermoplastic in nature, and do not require curing or crosslinking agents in their preparation. Additionally, the tensile strengths of the blends of the present invention are superior to that predicted from the individual contributive effects of the polymer components, i.e., greater than any one polymer component of the blends. Blend tensile strengths may be improved further by including therein at least one polyethylene.

SUMMARY OF THE INVENTION

Certain thermoplastic polymer blends have tensile strengths greater than that of any one polymer component. The blends comprise (1) at least one ethylene-propylene-diene (EPDM) polymer containing about 63 to about 85 wt.% ethylene, about 5 wt.% to about 37 wt.% propylene, and about 0.2 wt.% to about 15 wt.% of a diene monomer, (2) at least one ethylene-ethyl acrylate (EEA) copolymer containing about 60 wt.% to about 98 wt.% ethylene, and (3) optionally, at least one polyethylene (PE). No curing or crosslinking agents are needed to obtain the superior tensile strengths of the thermoplastic blends.

DETAILED DESCRIPTION

The thermoplastic polymer blends of this invention comprise a physical mixture of two polymer components and, optionally, a third polymer component; i.e., (1) at least one ethylene-propylene-diene (EPDM) polymer containing about 63 to about 85 wt.% ethylene, about 5 wt.% to about 37 wt.% propylene, and about 0.2 wt.% to about 15 wt.% of a diene monomer, (2) at least one ethylene-ethyl acrylate (EEA) copolymer containing about 60 wt.% to about 98 wt.% ethylene, and (3) optionally, at least one polyethylene (PE).

The above polymers are mixed in a range from about 5 weight parts to about 500 weight parts of EEA copolymer per 100 weight parts of EPDM polymer. Similarly, PE when used may be mixed in a range from about 5 weight parts to about 200 weight parts per 100 weight parts of EPDM polymer. Excellent results are obtained using a range of EEA copolymer from about 20 weight parts to about 300 weight parts per 100 weight parts of EPDM. Excellent results also are obtained using PE as an optional third polymeric blend component in a range from about 10 weight parts to about 100 weight parts per 100 weight parts of EPDM.

The polymer blends are truly thermoplastic, having excellent strength and structural stability at ambient temperatures, as well as easy processability at temperatures above about 120° C. A smooth roll is formed in milling operations at such temperatures, and the blends are readily extrudable and moldable, having good flow properties. Formed items made from the blends are reprocessable. In contrast to the thermoplastic blends disclosed in U.S. Patent Nos. 3,785,643 and 3,806,558, the polymer blends of the present invention do not need curing or crosslinking agents to effect partial cure of the polymer components, particularly the EPDM polymer.

Ethylene-Propylene-Diene (EPDM) Polymers

The EPDM polymers used comprise interpolymerized units of ethylene, propylene and diene monomers. Ethylene constitutes from about 63 wt.% to about 85 wt.% of the polymer, propylene from about 5 wt.% to about 37 wt.%, and the diene from about 0.2 wt.% to about 15 wt.%, all based upon the total weight of EPDM polymer. Preferably, ethylene comprises from about 68 wt.% to about 78 wt.%, propylene from about 17 wt.% to about 31 wt.%, and the diene from about 2 wt.% to about 10 wt.% of the EPDM polymer. Suitable diene monomers include conjugated dienes such as butadiene, isoprene, chloroprene, and the like; nonconjugated dienes containing from 5 to about 25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo(4,2,1)-nona-3,7-diene, and the like, indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclodienes such as 3-methyltricyclo $(5,2,1,0^{2,6})$-deca-3,8-diene and the like. More preferred dienes include the nonconjugated dienes. Excellent results were obtained using alkenyl norbornenes and nonconjugated dienes, specifically 5-ethylidene-2-norbornene and 1,4-hexadiene.

The EPDM polymers can be prepared readily following known suspension and solution techniques, such as those described in U.S. Patent 3,646,169 and in Friedlander, Encyclopedia of Polymer Science and Technology, Vol. 6, pp. 338–386 (New York, 1967). The EPDM polymers are high molecular weight, solid elastomers. They typically have a Mooney viscosity of at least about 20, preferably from about 25 to about 150 (ML 1+8 at 125° C.) and a dilute solution viscosity (DSV) of at least about 1, preferably from about 1.3 to about 3 measured at 25° C. as a solution of 0.1 gram of EPDM polymer per deciliter of toluene. The raw polymers may have typical green tensile strengths from about 800 psi to about 1,800 psi, more typically from about 900 psi to about 1,600 psi, and an elongation at break of at least about 600 percent.

The ethylene-propylene-diene (EPDM) polymers employed typically also have unstretched crystallinity ranging from about 1% to about 25% based upon the weight of the EPDM polymer. The unstretched crystallinity of the EPDM polymers is measured using a known X-ray technique described by Natta et al, 8 Atti Accad-Nazi. Rend. 11 (1957). The exact method used comprises pressing at 0.020 inch thick film of an EPDM polymer at 120° C. and 20,000 psi. The film is cooled quickly (quenched), annealed at room temperature for at least 24 hours, mounted and exposed to X-rays, with a diffraction scan being made across an angular range. Using a diffractometer, a plot is made of the angular distribution of the radiation scattered by the film. This plot is seen as a diffraction pattern of sharp crystalline peaks superimposed upon an amorphous peak. A quantitative value of weight percent crystallinity is obtained by dividing the crystalline diffraction area by the total diffraction area of the plot.

The EPDM polymers used in the present invention also generally exhibit a melt endotherm from about 1 to about 15 calories/gram, preferably from about 2 to about 10 calories/gram. The melt endotherm is measured using a Differential Scanning Calorimeter (DSC) sold by the Perkin-Elmer Corporation as the Perkin-Elmer DSC-2. The test measures heat of fusion within the polymer. A completely amorphous EPDM terpolymer would have a zero melt endotherm. The test consists of placing a polymer sample of known weight, which has been annealded at room temperature for at least 24, hours, in a closed aluminum pan (DSC cell calorimeter pans were used). The polymer sample in the pan is heated at a rate of 10° C./minute over a temperature range from −100° C. to +140° C. The reference material is glass beads. The DSC chart is precalibrated, using metals having known heats of fusion, in order to provide a chart having a unit area in terms of calories/square inch/minute. As the polymer sample is heated, a crystalline melt point peak appears on the chart. The area under the crystalline melt point peak is measured, and the melt endotherm in calories/gram is calculated from the area obtained. Two melt endotherm measurements can be obtained from one test, i.e., a measurement on heating the sample and a measurement on cooling the sample.

Ethylene-Ethyl Acrylate (EEA) Polymers

The ethylene-ethyl acrylate (EEA) polymers employed in the present invention consist essentially of interpolymerized units of ethylene and ethyl acrylate. Ethylene constitutes from about 60 wt.% to about 98 wt.% of the polymer and ethyl acrylate from about 2 wt.% to about 40 wt.%, based upon the total weight of EEA polymer. More preferably, ethylene constitutes from about 70 wt.% to about 95 wt.% of the polymer and ethyl acrylate from about 5 wt.% to about 30 wt.% based upon the total weight of EEA polymer. The EEA polymers typically also have a density from about 0.91 to about 0.96 g/cc, preferably from about 0.92 to about 0.95 g/cc, as well as typical melt indices from about 0.1 to about 30 grams/10 minutes (measured according to ASTM D1238 at 190° C. under a load of 2.16 kg).

The EEA polymers can be prepared readily following known techniques, such as those described in Encyclopedia of Polymer Science and Technology, Vol. 6, pp. 387–430 (New York, 1967). As mentioned heretofore, the EEA copolymers are used in the blends at a level from about 5 weight parts to about 500 weight parts per 100 weight parts of EPDM polymer. Particularly good results are obtained when the EEA copolymers are used at about 20 weight parts to about 300 weight parts per 100 weight parts of EPDM polymer.

Polyethylene

The polyethylene (PE) used as an optional third component in the blend can be a low density (e.g., about 0.910–0.925 grams/cc), medium density (e.g., about 0.926–0.940 grams/cc) or high density (e.g., about 0.941–0.965 grams/cc) polyethylene. The low density polyethylenes are preferred. The polyethylenes typically have a melt index from about 0.1 gram/10 minutes to about 30 grams/10 minutes, measured at 190° C. under a 2.16 kilogram load. If a low density polyethylene is used, the melt index is preferably between about 0.2 grams/10 minutes and about 7 grams/10 minutes. The polyethylenes are available commercially and can be prepared readily using standard polymerization techniques known in the art. As mentioned before, the polyethylenes may be used at a level from about 5 weight parts to about 200 weight parts per 100 weight parts of EPDM polymer, more preferably about 10 weight parts to about 100 weight parts per 100 weight parts of EPDM polymer.

Thermoplastic Polymer Blends

The compositions of the invention comprise thermoplastic physical blends of (1) at least one EPDM polymer, (2) at least one ethylene-ethyl acetate (EEA) polymer, and (3) optionally, at least one polyethylene (PE), all of which have been described heretofore. No curing or crosslinking agents are needed, but they may be used. It was unexpected that the thermoplastic polymer blends of the defined EPDM and EEA polymers would exhibit tensile strengths greater than that of either component alone. It was also unexpected that the three-component blends of EPDM polymers, EEA polymers and polyethylenes would also demonstrate even greater enhanced tensile strengths. Moreover, the polymer blends of this invention are truly thermoplastic; they are moldable and remoldable at temperatures above about 120° C., preferably from about 140° C. to 200° C., yet they are strong, flexible solids at room temperature.

A wide range of rubber and plastic compounding ingredients are mixed readily with the thermoplastic polymer blends using mixing equipment such as two-roll mills, extruders, Banbury mixers, and the like. Standard addition and mixing techniques are used. In some cases, the addition of compounding ingredients, particularly waxes, plasticizers, and extenders, can detract from the overall tensile strengths of the thermoplastic blends. In contrast, reinforcing fillers such as fumed silica generally provide increased tensile strengths to the blends.

Examples of suitable compounding ingredients include metal oxides such as zinc, calcium, and magnesium oxide, lead monoxide and dioxide; fatty acids such as stearic and lauric acid, and salts thereof such as cadmium, zinc and copper stearate and lead oleate; fillers such as the carbon blacks including channel blacks, high reinforcing blacks an N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin and the like; antioxidants, antiozonants, and stabilizers such as di-β-naphthyl-p-phenylenediamine, phenyl-β-naphthylamine, dioctyl-p-phenylenediamine, N-1,3-dimethyl-butyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-butylaniline)-4,6-bis(octylthio)-1,3,5-triazine, hexahydro-1,3,5-tris-β-(3,5-di-t-butyl-4-hydroxyphenyl)-propionyl-s-triazine, tris-(3,5-di-t-butyl-4-hydroxybenzyl)isocyanurate, tetrakismethylene-3-(3',5'-di-t-butyl-4'-hydroxyphenyl) propionate methane, distearyl thiodipropionate, dilauryl thiodipropionate, tri(nonylated-phenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, wire and cable insulation, molded items such as shoe soles and kitchen ware, sheet products such as mats and liners (including pond liners for aeration ponds in sewage treatment plants), and the like.

The following examples illustrate the present invention more fully. Unless otherwise stated, the ingredients recited in the recipes are in units of parts by weight.

EXAMPLES

General Mixing Procedure and Sample Procedure

The polymeric components of the blends, along with compounding ingredients (if used), were mixed together using a 6-inch, two-roll mill. Front roll temperature was about 160° C., with the back roll slightly cooler. The EPDM polymer was banded on the mill, and the other polymer and compounding (if used) ingredients were added to the banded polymer. Mill time was about 5 minutes.

The mixing conditions described above are not critical. The important factor is to achieve uniform dispersion of the polymers and ingredients in the thermoplastic blend. This object can be accomplished using other equipment, such as a Banbury mixer, by mixing at other temperatures and for other times, and the like. Such conditions and procedures are well known to the person skilled in the art. The above conditions were used to achieve thorough mixing, and are outlined to illustrate preparation of the physical blends of the examples.

Test Methods

Stress-strain properties (i.e., tensile, modulus and elongation) were tested following the procedure in ASTM D638 using a Type IV dumbbell and a pull rate of 20 inches/minutes. Although not reported in the following examples, modulus and elongation data were within acceptable limits. Ethylene, propylene and diene contents of the EPDM polymers were determined by infrared spectroscopy. Ethylene and ethyl acrylate contents of the EEA polymers were measured using proton NMR spectroscopy. Mooney viscosity was measured at 100° C. and/or 150° C. using a large rotor, a one-minute warm-up time, and an 8-minute shearing time, and the results were interpolated to 125° C. using a known interpolation chart. Melt index was measured according to ASTM D1238 at 190° C. under a load of 2.16 kg.

Materials

TABLE I summarizes the properties of the EPDM, EEA and PE polymers used in the following examples.

TABLE I

| | Raw Polymer Data | | | | | | |
|---|---|---|---|---|---|---|---|
| | Wt. Percent Monomers | | | | | | Melt Index, |
| Polymer | Ethylene | Propylene | Diene | Ethyl Acrylate | Mooney Viscosity ML 1 + 8 (125° C.) | Density, grams/cc | grams/10 minutes |
| EPDM | 71 | 25 | 4* | 0 | 55 | — | — |
| EEA-1 | 80 | 0 | 0 | 20 | — | 0.933 | 2.4 |
| EEA-2 | 83 | 0 | 0 | 17 | — | 0.931 | 20 |
| NA-301** | 100 | 0 | 0 | 0 | — | 0.92 | 1.3 |

*5-Ethylidene-2-norbornene as termonomer.
**A low density polyethylene sold by USI Chemicals as NA301PE.

EXAMPLES 1–2

In each of examples 1 and 2 the tensile strength of the blend is higher than predicted, i.e., higher than any one EPDM or EEA polymer component of the blend.

Test data is summarized in TABLE II.

TABLE II

| EPDM-EEA Blends | | |
|---|---|---|
| Tensile Strength of Polymer, psi | Example | |
| | 1 | 2 |
| EPDM 1390 | 100 | 100 |
| EEA-1 1430 | 50 | — |
| EEA-2 1030 | — | 50 |
| Blend | | |
| Tensile Strength, psi | 2000 | 1650 |
| Greater than Predicted | yes | yes |

EXAMPLES 3–6

Example 3 demonstrates that the optional polyethylene (PE) third component defined heretofore improves blend tensile strength further. The example 3 blend has a tensile strength greater than any of its three polymer components, and also greater than the two-component EPDM-EEA polymer blend of example 4.

Example 5 also demonstrates that the optional polyethylene (PE) third component defined heretofore improves blend strength further. The example 5 blend has a tensile strength greater than any of its three polymer components, and also greater than the two-component EPDM-EEA polymer blend of example 6.

Test data is summarized in TABLE III.

TABLE III

| EPDM-EEA-PE Blends | | | | |
|---|---|---|---|---|
| Tensile Strength of Polymer, psi | Example | | | |
| | 3 | 4 | 5 | 6 |
| EPDM 1250 | 100 | 100 | 100 | 100 |
| EEA-1 1400 | 50 | 50 | — | — |
| EEA-2 1010 | — | — | 50 | 50 |

TABLE III-continued

| | | | | | |
|---|---|---|---|---|---|
| NA-301+ Blend | 1690 | 25 | — | 25 | — |
| Tensile Strength, psi | — | 2100 | 1625 | 1910 | 1400 |
| Greater than Predicted | — | yes | yes | yes | yes |

+A low density polyethylene sold by USI Chemicals as NA301PE.

We claim:

1. A thermoplastic polymer blend comprising
   (1) 100 weight parts of at least one EPDM polymer consisting essentially of interpolymerized units of about 63 wt.% to about 85 wt.% ethylene, about 5 wt.% to about 37 wt.% propylene, and about 0.2 wt.% to about 15 wt.% of a diene monomer, and
   (2) from about 5 weight parts to 500 weight parts of at least one ethylene-ethyl acrylate (EEA) polymer consisting essentially of interpolymerized units of about 60 wt.% to about 98 wt.% ethylene, and about 2 wt.% to about 40 wt.% ethyl acrylate.

2. A thermoplastic polymer blend of claim 1 wherein
   (1) the EPDM polymer consists essentially of interpolymerized units of about 68 wt.% to 78 wt.% ethylene, 17 wt.% to 31 wt.% propylene, and 2 wt.% to ethylene, 17 wt.% to 31 wt.% propylene, and 2 wt.% to 10 wt.% of a nonconjugated diene monomer containing from 5 to about 25 carbon atoms, and
   (2) the EEA polymer consists essentially of interpolymerized units of about 70 wt.% to 95 wt.% ethylene, and 5 wt.% to 30 wt.% ethyl acrylate.

3. A thermoplastic polymer blend of claim 2 wherein the nonconjugated diene is an alkenyl norbornene.

4. A thermoplastic polymer blend of claim 3 wherein the alkenyl norbornene is 5-ethylidene-2-norbornene.

5. A thermoplastic polymer blend of claim 3 wherein from about 20 to about 300 weight parts of EEA polymer is used per 100 weight parts of EPDM polymer.

6. A thermoplastic polymer blend of claim 2 wherein the nonconjugated diene is 1,4-hexadiene.

7. A thermoplastic polymer blend of claim 1 wherein from about 5 weight parts to about 200 weight parts of at least one polyethylene is used per 100 weight parts of EPDM polymer.

8. A thermoplastic polymer blend of claim 7 wherein
   (1) the EPDM polymer consists essentially of interpolymerized units of about 68 wt.% to 78 wt.% ethylene, 17 wt.% to 31 wt.% propylene, and 2 wt.% to 10 wt.% of a nonconjugated diene monomer containing from 5 to about 25 carbon atoms, and
   (2) the EEA polymer consists essentially of interpolymerized units of about 70 wt.% to 95 wt.% ethylene, and 5 wt.% to 30 wt.% ethyl acrylate.

9. A thermoplastic polymer blend of claim 8 wherein the nonconjugated diene is an alkenyl norbornene.

10. A thermoplastic polymer blend of claim 9 wherein the alkenyl norbornene is 5-ethylidene-2-norbornene.

11. A thermoplastic polymer blend of claim 9 wherein from about 20 to about 300 weight parts of EEA polymer is used per 100 weight parts of EPDM polymer.

12. A thermoplastic polymer blend of claim 8 wherein the nonconjugated diene is 1,4-hexadiene.

* * * * *